US012075106B2

United States Patent
Liu

(10) Patent No.: US 12,075,106 B2
(45) Date of Patent: Aug. 27, 2024

(54) MESSAGE SENDING METHOD AND DEVICE, READABLE MEDIUM AND ELECTRONIC DEVICE

(71) Applicant: BEIJING BYTEDANCE NETWORK TECHNOLOGY CO., LTD., Beijing (CN)

(72) Inventor: Qing Liu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 17 days.

(21) Appl. No.: 17/769,739

(22) PCT Filed: Aug. 19, 2020

(86) PCT No.: PCT/CN2020/110041
§ 371 (c)(1),
(2) Date: Apr. 16, 2022

(87) PCT Pub. No.: WO2021/073248
PCT Pub. Date: Apr. 22, 2021

(65) Prior Publication Data
US 2022/0394316 A1 Dec. 8, 2022

(30) Foreign Application Priority Data
Oct. 16, 2019 (CN) .......................... 201910985122.3

(51) Int. Cl.
*H04N 21/262* (2011.01)
*H04L 12/18* (2006.01)
*H04N 21/8547* (2011.01)

(52) U.S. Cl.
CPC ... *H04N 21/26208* (2013.01); *H04L 12/1813* (2013.01); *H04N 21/8547* (2013.01)

(58) Field of Classification Search
CPC .......... H04N 21/26208; H04N 21/8547; H04L 12/1813
See application file for complete search history.

(56) References Cited

U.S. PATENT DOCUMENTS

| | | | | |
|---|---|---|---|---|
| 9,641,989 | B1* | 5/2017 | Dietrich | ............. H04N 21/4788 |
| 2006/0294333 | A1* | 12/2006 | Michaylov | ............. G06F 9/526 |
| | | | | 711/168 |

(Continued)

FOREIGN PATENT DOCUMENTS

| | | |
|---|---|---|
| CN | 105391785 A | 3/2016 |
| CN | 105979343 A | 9/2016 |

(Continued)

OTHER PUBLICATIONS

International Patent Application No. PCT/CN2020/110041; Int'l Written Opinion and Search Report; dated Nov. 9, 2020; 8 pages.

(Continued)

*Primary Examiner* — Randy A Flynn
(74) *Attorney, Agent, or Firm* — BakerHostetler

(57) ABSTRACT

A message sending method, a message sending apparatus, a readable medium, and an electronic device are provided. The method includes: determining a message type of a current message received in a current time window, where the message type includes a first message type and a second message type; buffering the current message in a target buffer queue corresponding to the current message if the determined message type is the first message type, where each message in the target buffer queue has an associated timestamp; and sending the current message to a target client if the determined message type is the second message type, and a total number of messages sent to the target client (Continued)

within the current time window does not reach a first preset threshold, where the target client is a receiver of the current message.

15 Claims, 2 Drawing Sheets

(56) References Cited

U.S. PATENT DOCUMENTS

| | | | |
|---|---|---|---|
| 2016/0149967 A1* | 5/2016 | Lewis | H04L 65/612 |
| | | | 715/753 |
| 2017/0317944 A1 | 11/2017 | John et al. | |
| 2018/0176276 A1 | 6/2018 | Gandhi et al. | |
| 2019/0394146 A1* | 12/2019 | Wang | H04N 21/4882 |

FOREIGN PATENT DOCUMENTS

| | | |
|---|---|---|
| CN | 106028163 A | 10/2016 |
| CN | 106507133 A | 3/2017 |
| CN | 107231294 A | 10/2017 |
| CN | 107666619 A | 2/2018 |
| CN | 108174305 A | 6/2018 |
| CN | 108495166 A | 9/2018 |
| CN | 109274988 A | 1/2019 |
| CN | 110138679 A | 8/2019 |
| CN | 110662085 A | 1/2020 |
| JP | 2009-009592 A | 1/2009 |
| JP | 2009-089019 A | 4/2009 |
| JP | 5530474 B2 | 6/2014 |
| JP | 2016-132664 A | 7/2016 |
| WO | WO 2016/168581 A1 | 10/2016 |
| WO | WO 2018/057066 A1 | 3/2018 |
| WO | WO 2018/095096 A1 | 5/2018 |

OTHER PUBLICATIONS

European Patent Application No. 20877202.0; Extended Search Report; dated Nov. 28, 2023; 8 pages.

* cited by examiner

MESSAGE SENDING METHOD AND DEVICE, READABLE MEDIUM AND ELECTRONIC DEVICE

CROSS-REFERENCE TO RELATED APPLICATION

The present application is the national phase application of PCT International Patent Application No. PCT/CN2020/110041, titled "MESSAGE SENDING METHOD AND DEVICE, READABLE MEDIUM AND ELECTRONIC DEVICE", filed on Aug. 19, 2020, which claims priority to Chinese Patent Application No. 201910985122.3, titled "MESSAGE SENDING METHOD AND DEVICE, READABLE MEDIUM AND ELECTRONIC DEVICE", filed on Oct. 16, 2019, both of which are_incorporated herein by reference in their entireties.

FIELD

The present disclosure relate to the technical field of communication, and in particular to a message sending method, a message sending apparatus, a readable medium, and an electronic device.

BACKGROUND

With the continuous increase of network users, some live broadcast platforms may have millions of users online at the same time. In this case, the number of messages transmitted on through the network also grows rapidly. However, the receiving capacity of the user client is limited, and the transmission capacity of the network is also limited. If the server pushes all messages to the user client, too much network resources are occupied, resulting in a waste of network resources, and causing network congestion.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

In a first aspect, a message sending method is provided according to the present disclosure. The method includes:

determining a message type of a current message received in a current time window, where the message type includes a first message type and a second message type;

buffering the current message in a target buffer queue corresponding to the current message if the determined message type is the first message type, where each message in the target buffer queue has an associated timestamp; and sending the current message to a target client if the determined message type is the second message type, and a total number of messages sent to the target client within the current time window does not reach a first preset threshold, where the target client is a receiver of the current message.

In a second aspect, a message sending apparatus is provided according to the present disclosure. The apparatus includes:

a determining module, configured to determine a message type of a current message received in a current time window, where the message type includes a first message type and a second message type;

a buffering module, configured to buffer the current message in a target buffer queue corresponding to the current message if the determined message type is the first message type, where each message in the target buffer queue has an associated timestamp; and a sending module, configured to send the current message to a target client if the determined message type is the second message type, and a total number of messages sent to the target client within the current time window does not reach a first preset threshold, where the target client is a receiver of the current message.

In a third aspect, a computer-readable medium storing a computer program is provided according to the present disclosure. The computer program, when executed by a processing apparatus, implements steps of the method according to any one of items of the first aspect.

In a fourth aspect, an electronic device is provided according to the present disclosure. The electronic device includes:

a storage apparatus storing a computer program; and a processing apparatus, configured to execute the computer program in the storage apparatus, to implement steps of the method according to any one of items of the first aspect.

Other features and advantages of the present disclosure will be described in detail in the following embodiments.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale. In the drawings.

DESCRIPTION OF EMBODIMENTS

Figure 1:
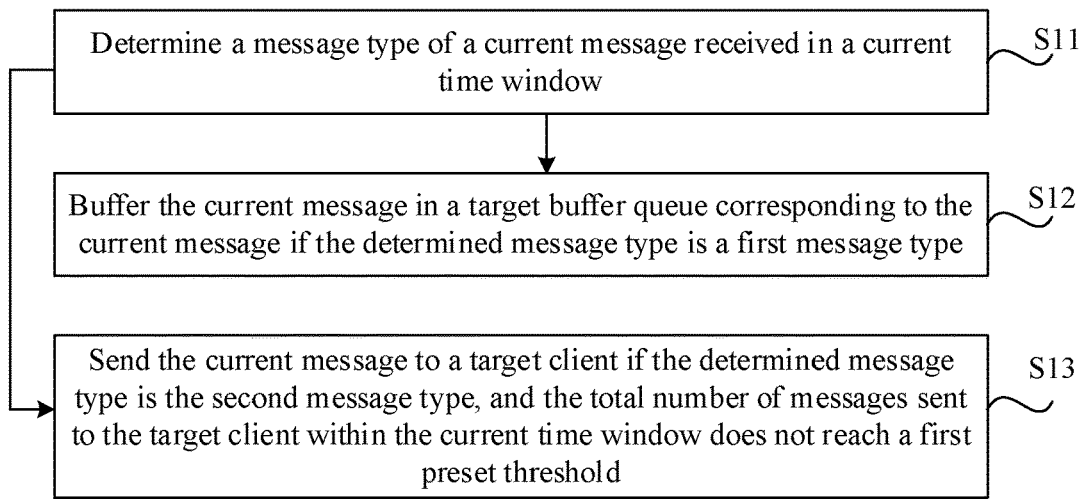
FIG. 1 is a flowchart of a message sending method according to an exemplary embodiment.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, that is, "including but not limited to". The term "based on" means "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or multiple".

The names of messages or information exchanged between multiple devices in the embodiments of the present disclosure are only for illustrative purposes, and are not intended to limit the scope of these messages or information.

During research, the inventor found that when controlling the number of messages sent to the user client, different message types have different demands on real-time performance, and need different message sending methods accordingly. For example, chat messages in a live broadcast room have lower demands on real-time performance. In contrast, leaderboard news in the live broadcast room have higher demands on real-time performance, in which case a server needs to send the latest message to the user client, so as to ensure that the user can get the latest ranking information through the leaderboard message.

FIG. 1 is a flow chart showing a message sending method according to an exemplary embodiment. The method is applicable to a server, such as a cloud server, a message management server, a live broadcast platform, and the like. As shown in FIG. 1, the message sending method may include the following steps S11 to S13.

In step S11, a message type of a current message received in a current time window is determined.

A preset duration corresponding to the time window may be preset. For example, the preset duration may be set to 1 s. Specifically, within the current 1 s, on reception of the current message, the server may determine the message type of the current message. The message type includes a first message type and a second message type, and a message of the first message type has higher demands on real-time performance, and a message of the second message type has lower demands on real-time performance.

In an embodiment, the message sending method may be applied to, for example, a live broadcast platform. Specifically, a message of the first message type may include at least one of: a leaderboard messages, a like message, and an emoticon message; and a message of the second message type may include at least one of: a chat message, a barrage message, and a gift-giving message.

In step S12, the current message is buffered in a target buffer queue corresponding to the current message if the determined message type is the first message type.

The target buffer queue corresponds to the current message. For example, a Redis (Remote Dictionary Server) buffer queue may be used for storage. The message of the first message type is provided with a corresponding buffer queue. For example, if the current message is a like message, the message may be buffered in a buffer queue corresponding to like messages. If the current message is a leaderboard message, the message may be buffered in a buffer queue corresponding to leaderboard messages. If the current message is an emoticon message, the message may be buffered in the buffer queue corresponding to emoticon messages.

Moreover, each message buffered in the target buffer queue has an associated time stamp. The timestamp may identify a time instant at which each message is received by the server. For example, the timestamp may identify that in the current 1 s, a message is received at the 100th ms, and another message is received at the 500th ms. The time stamp may alternative identify an order in which each message in the buffer queue is received. By buffering the messages received in the current time window into the target buffer queue, the latest message received in the current time window may be determined.

In step S13, the current message is sent to a target client if the determined message type is the second message type, and the total number of messages sent to the target client within the current time window does not reach a first preset threshold.

The target client may be the receiver of the current message, for example, a client of a user viewing a live broadcast. The client may be, for example, a smart phone, a notebook computer, a desktop computer, and the like. The target client is limited in the capability of receiving messages, and some messages are of low importance and are not necessarily sent to the target client. An excess of messages sent to the target client may cause a waste of resources and network congestion. Therefore, it is required to limit the total number of messages sent by the server to the target client within a time window. Specifically, the first preset threshold may represent the upper limit of the number of messages that is allowed to be sent to the target client in the current time window. The first preset threshold may be set as required. For example, the first preset threshold may be set according to a priority of a message of the second message type. The first preset threshold corresponding to a high priority message is higher than the first preset threshold corresponding to a low priority message.

For example, if the priority of the barrage message is higher than the priority of the chat message, the first preset threshold corresponding to the barrage message is higher than the first preset threshold corresponding to the chat message. For example, in the current time window, the upper limit of the number of the barrage messages that is allowed to be sent to the target client is set to 200, the upper limit of the number of the chat messages that is allowed to be sent is set to 150, and the upper limit of the number of the gift messages that is allowed to be sent is set to 100. For example, if the current message is the barrage message, and the total number of barrage messages that have been sent to the target client in the current 1 s is 120, which does not reach 200, the current message may be sent to the target client. In an embodiment, a common upper limit value of 450 may be set for the chat messages, the barrage messages, and the gift messages, without setting their respective upper limit values.

Since a message of the second message type (for example, chat messages) has lower demands on real-time performance, and an additional buffer queue occupies system storage space, no buffer queue is set for the message of the second message type. Instead, the message of the second message type is sent on a first-come-first-served basis, the number of messages sent within the current time window is counted, and the first preset threshold is set to limit the number of sent messages.

In the above technical solution, the message type of the received current message is determined. If the current message is of the first message type, the current message is buffered in the target buffer queue corresponding to the current message. If the current message is of the second message type, and the total number of messages sent in the current time window does not reach the first preset threshold, the current message is sent to the target client. In this way, by controlling the number of messages sent to the target client, network congestion can be effectively avoided and network resources can be saved. In addition, different message processing methods are adopted for different message types, so that messages of different types are processed in a targeted manner.

Figure 2:
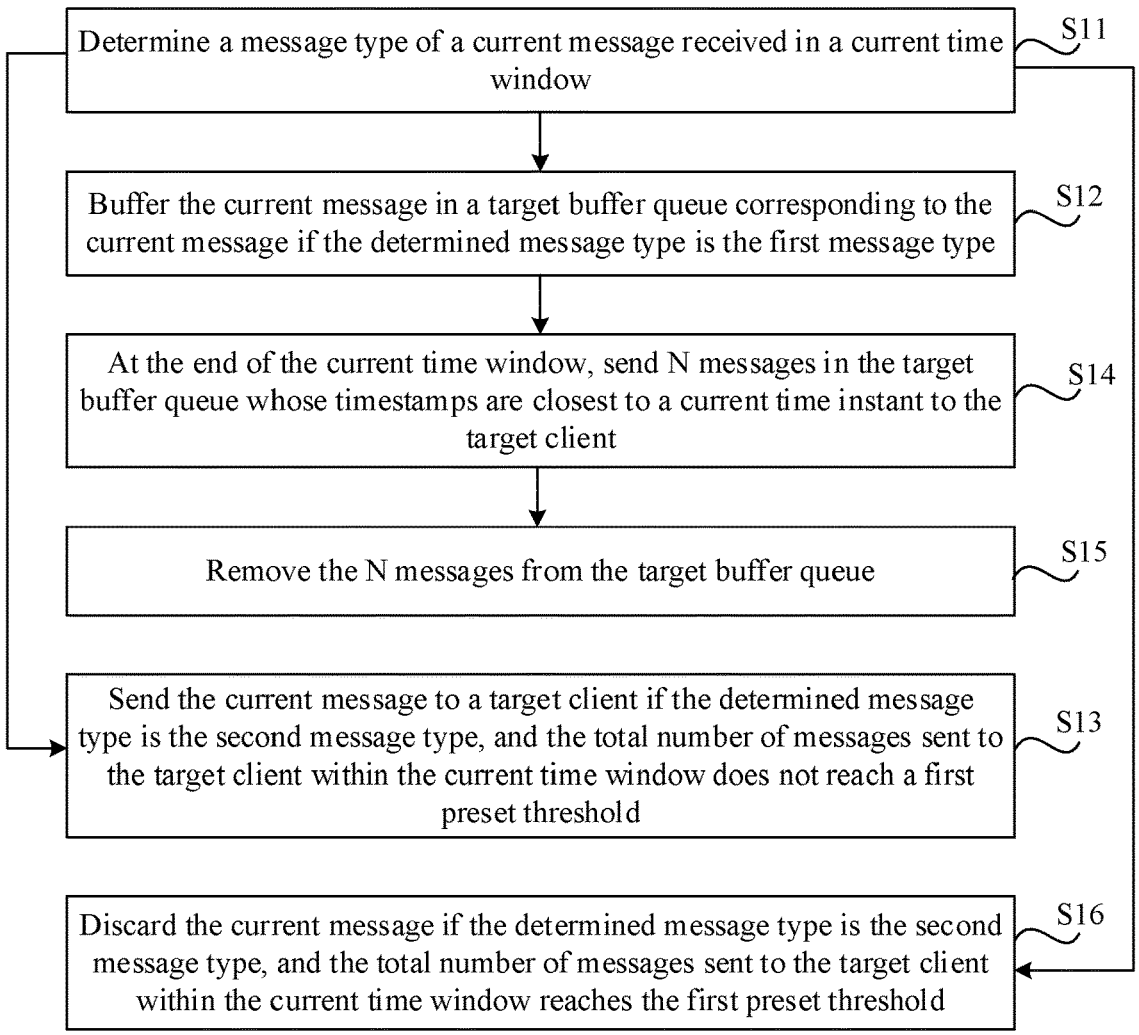
FIG. 2 is a flowchart of a message sending method according to another exemplary embodiment.

FIG. 2 is a flow chart of a message sending method according to another exemplary embodiment. As shown in FIG. 2, optionally, if the determined message type is the first message type, the method may further include the following step S14.

In step S14, at the end of the current time window, N messages in the target buffer queue whose timestamps are closest to a current time instant are sent to the target client.

For example, the length of the time window is 1 s. At the end of the current time window, messages received within this 1 s stored in the target buffer queue may be sorted according to the timestamps from the latest to the earliest, and the top N messages are the N messages whose timestamps are closest to the current time instant. The server may send the N messages to the target client, where N is a positive integer, and the maximum value of N is a second preset threshold. Specifically, the second preset threshold may be set according to actual requirements. For example, for the leaderboard messages, the second preset threshold may be set to 100. For emoticon messages, the second preset threshold may be set to 120. For like messages, the second preset threshold may be set to 150.

Through the above technical solution, if the current message is of the first message type, the message closest to the current time instant is sent to the target client, so as to ensure that the message received by the target client is the latest message. For example, for the leaderboard messages, the user is informed of the latest ranking, and the real-time performance of the sent message is ensured. Meanwhile, the maximum value of N may be the set second preset threshold, which effectively limits the number of messages sent to the target client, thereby effectively avoiding network congestion.

Optionally, as shown in FIG. 2, after the N messages are sent to the target client, the method may further include the following step S15.

In step S15, the N messages are removed from the target buffer queue.

After the current time window ends, the target buffer queue needs to receive messages of a next time window. Therefore, after N messages are sent to the target client, the N messages need to be removed from the target buffer queue, such that the target buffer queue can receive the messages of the next time window in time, so as to ensure the normal processing and sending of the messages of the next time window. For example, the N messages may be removed by setting timed automatic clearing, for example, the messages in the buffer queue are cleared once every time window (for example, 1 s).

Optionally, step S14 may include:
synchronizing messages in the target buffer queue into a memory; and sending N messages in the memory whose timestamps are closest to a current time instant to the target client.

Due to the small storage capacity and limited processing capacity of the buffer, if a large number of messages are processed in the buffer, normal operation of the buffer may be affected. Therefore, the messages in the target buffer queue may be synchronized into the memory, which may be, for example, a system memory of a message management server. Specifically, messages may be synchronized from the buffer queue to the system memory through an intermediate service layer, which is located between the buffer and the system memory, and may function to synchronizing and forwarding messages. Since the system memory has a large storage space, and may be expended as needed, the system memory is capable of processing a large amount of messages.

Specifically, in the memory, N messages whose timestamps are closest to the current time instant are sent to the target client. As described above, for example, the messages received in the current time window may be sorted according to the timestamps, to determine the N messages closest to the current time instant, where N is a positive integer, and the maximum value of N is the second preset threshold.

In the above technical solution, by synchronizing the messages in the target buffer queue to the memory, and determining the N messages closest to the current time instant in the memory, the problem that the small storage space of the buffer affects the message processing efficiency can be avoided. Processing messages in memory can improve the speed and efficiency of message processing.

Optionally, as shown in FIG. 2, the method may further include the following step S16.

In step S16, if the determined message type is the second message type, and the total number of messages sent to the target client within the current time window reaches the first preset threshold, the current message may be discarded.

As described above, the receiving capability of the target client and the transmission capability of the network are both limited, when an excess of messages are sent, network congestion and network delay are likely to occur. Therefore, if the total number of messages sent to the target client within the current time window reaches the first preset threshold, the server may discard the current message without storing or processing the current message.

In this way, the storage resources of the server can be saved, and the number of messages sent to the target client can also be effectively controlled, thereby saving network resources and avoiding network congestion.

Figure 3:
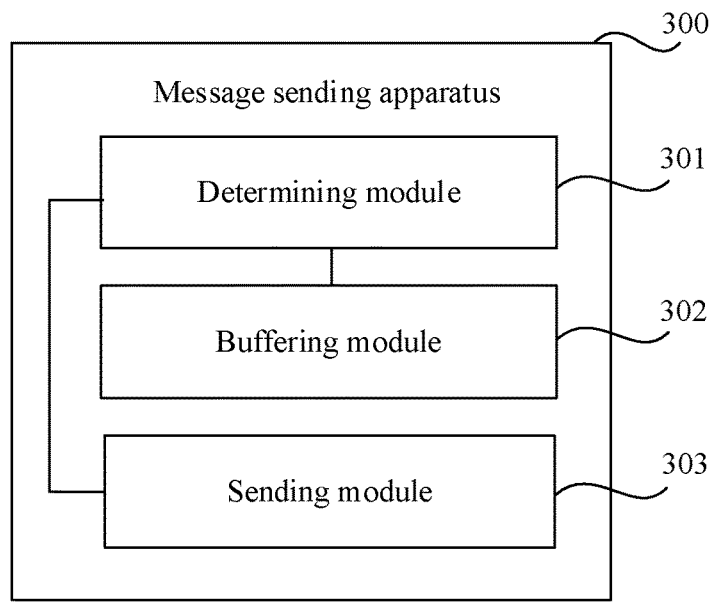
FIG. 3 is a block diagram of a message sending apparatus according to an exemplary embodiment.

Based on the same inventive concept, a message sending apparatus is further provided according to the present disclosure. FIG. 3 is a block diagram of a message sending apparatus according to an exemplary embodiment. As shown in Figure, the apparatus 300 may include a determining module 301, a buffering module 302, and a sending module 303.

The determining module 301 is configured to determine a message type of a current message received in a current time window, where the message type includes a first message type and a second message type.

The buffering module 302 is configured to buffer the current message in a target buffer queue corresponding to the current message if the determined message type is the first message type, where each message in the target buffer queue has an associated timestamp; and The sending module 303 is configured to send the current message to a target client if the determined message type is the second message type, and the total number of messages sent to the target client within the current time window does not reach a first preset threshold, where the target client is a receiver of the current message.

In the above technical solution, the message type of the received current message is determined. If the current message is of the first message type, the current message is buffered in the target buffer queue corresponding to the current message. If the current message is of the second message type, and the total number of messages sent in the current time window does not reach the first preset threshold, the current message is sent to the target client. In this way, by controlling the number of messages sent to the target client, network congestion can be effectively avoided and network resources can be saved. In addition, different message processing methods are adopted for different message types, so that messages of different types are processed in a targeted manner.

Optionally, the sending module 303 is further configured to send, at the end of the current time window, N messages in the target buffer queue whose timestamps are closest to a current time instant to the target client, where N is a positive integer, and a maximum value of N is a second predetermined threshold.

Optionally, the apparatus 300 may further include a removing module.

The removing module is configured to remove the N messages from the target buffer queue after the N messages are sent to the target client.

Optionally, the sending module 303 may include a synchronizing sub-module and a sending sub-module.

The synchronizing sub-module is configured to synchronize messages in the target buffer queue into a memory.

The sending sub-module is configured to send N messages in the memory whose timestamps are closest to a current time instant to the target client.

Optionally, the apparatus 300 may further include a discarding module.

The discarding module is configured to discard the current message if the determined message type is the second message type and the total number of messages sent to the target client within the current time window reaches the first preset threshold.

Figure 4:
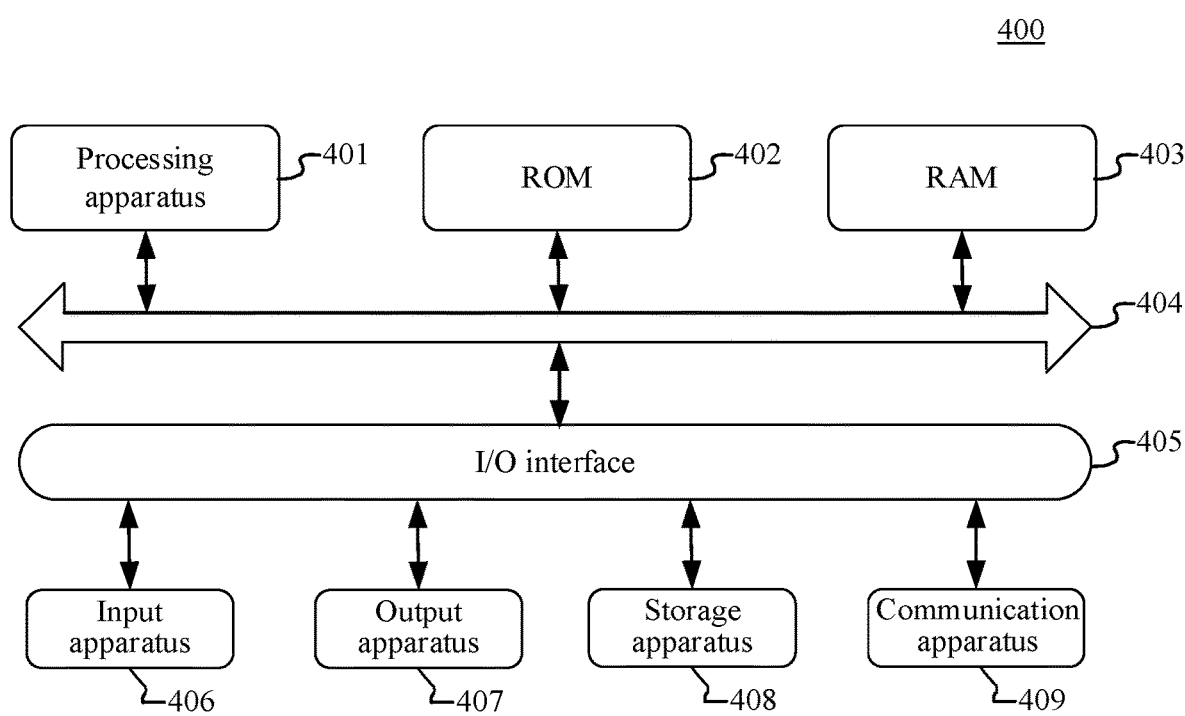
FIG. 4 is a schematic structural diagram of an electronic device according to an exemplary embodiment.

Reference is made to FIG. 4, which is a schematic structural diagram of an electronic device 400 according to an embodiment of the present disclosure. The electronic device shown in FIG. 4 is only an example, and should not bring any limitation to the function and scope of application of the embodiments of the present disclosure.

As shown in FIG. 4, the electronic device 400 may include a processing apparatus 401, such as a central processing unit or a graphics processor, which can execute various appropriate actions and processes based on a program stored in a Read Only Memory (ROM) 402 or a program loaded from a storage apparatus 408 into a Random Access Memory (RAM) 403. In the RAM 403, various programs and data required by the electronic device 400 for operation are further stored. The processing apparatus 401, the ROM 402, and the RAM 403 are connected to each other through a bus 404. An input/output (I/O) interface 405 is also connected to the bus 404.

Generally, the following may be connected to the I/O interface 405: an input apparatus 406 such as a touch screen, a touch pad, a keyboard, a mouse, a camera, a microphone, an accelerometer, a gyroscope, an output apparatus 407 such as a Liquid Crystal Display (LCD), a speaker, a vibrator, a storage apparatus 408 such as a magnetic tape, a hard disk, and a communication apparatus 409. Based on the communication apparatus 409, the electronic device 400 may communicate with other devices through wired or wireless communication to exchange data. Although FIG. 4 shows the electronic device 400 including various apparatuses, it should be understood that not all shown apparatuses are required to be implemented or included. The shown apparatuses may be replaced by other apparatuses, or more or less apparatuses may be included.

Specifically, the processes described with reference to flow charts, may be implemented as a computer software program according to an embodiment of the present disclosure. For example, a computer program product is provided according to an embodiment of the present disclosure, the computer program product includes a computer program embodied on a computer readable medium. The computer program includes program codes for performing the method shown in the flowchart. In such embodiments, the computer program may be downloaded and installed from the network through the communication apparatus 409, installed from the storage apparatus 408, or installed from the ROM 402. The computer program, when being executed by the processing apparatus 401, performs functions defined in the method according to the embodiments of the present disclosure.

It should be noted that the computer readable medium according to the present disclosure may be a computer readable signal medium or a computer readable storage medium or any combination of the two. The computer readable storage medium may include, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random Access Memory (RAM), a Read Only Memory (ROM, an Erasable Programmable Read Only Memory (EPROM or a flash memory), an optical fiber, a portable Compact Disk Read-Only Memory (CD-ROM), an optical storage device, a magnetic storage device, or any suitable combination of the foregoing. In the present disclosure, the computer readable storage medium may be any tangible medium containing or storing a program, where the program may be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium may send, transmit or transfer programs used by an instruction execution system, apparatus or device or used in combination therewith. The program codes included in the computer readable medium may be transferred through any proper medium including, but not limited to, an electric wire, an optical cable, RF (Radio Frequency), and the like, or any suitable combination of the foregoing.

In some embodiments, the server may use any currently known or future network protocol such as HTTP (HyperText Transfer Protocol) to communicate, and may be connected with a digital data network in any form or medium (such as a communication network). Examples of communication networks include a local area network (LAN), a wide area network (WAN), an internet (for example, the Internet), and a peer-to-peer network (such as the ad hoc peer-to-peer network), as well as any current or future networks.

The above mentioned computer-readable medium may be included in the above mentioned electronic device, or may exist alone without being assembled into the electronic device.

The above mentioned computer-readable medium carries one or more programs. The above mentioned one or more programs, when being executed by the electronic device, cause the electronic device to:

determine a message type of a current message received in a current time window, where the message type includes a first message type and a second message type;

buffer the current message in a target buffer queue corresponding to the current message if the determined message type is the first message type, where each message in the target buffer queue has an associated timestamp; and send the current message to a target client if the determined message type is the second message type, and a total number of messages sent to the target client within the current time window does not reach a first preset threshold, where the target client is a receiver of the current message.

The computer program codes for performing the operations according to the present disclosure may be written in at least one programming language or a combination of the at least one programming language. The programming language includes, but is not limited to, an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowchart and block diagrams in the drawings illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the drawings. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The modules involved in the embodiments of the present disclosure may be implemented in a software manner, or in a hardware manner. The name of the modules does not constitute a limitation of the modules under any circumstances. For example, the determining module may alternatively referred to as "determining unit".

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, a portable computer disk, a hard disk, a Random Access Memory (RAM), a Read Only Memory (ROM), an Erasable Programmable Read Only Memory (EPROM or a flash memory), a optical fiber, a Compact Disk Read Only Memory (CD-ROM), an optical storage device, a magnetic storage device, or any suitable combination thereof.

According to one or more embodiments of the present disclosure, in example 1, a message sending method is provided, which includes: determining a message type of a current message received in a current time window, where the message type includes a first message type and a second message type; buffering the current message in a target buffer queue corresponding to the current message if the determined message type is the first message type, where each message in the target buffer queue has an associated timestamp; and sending the current message to a target client if the determined message type is the second message type, and a total number of messages sent to the target client within the current time window does not reach a first preset threshold, where the target client is a receiver of the current message.

According to one or more embodiments of the present disclosure, in example 2 of example 1, if the determined message type is the first message type, the method further includes:

sending, at the end of the current time window, N messages in the target buffer queue whose timestamps are closest to a current time instant to the target client, where N is a positive integer, and a maximum value of N is a second predetermined threshold.

According to one or more embodiments of the present disclosure, in example 3 of example 2, after sending the N messages to the target client, the method further includes:

removing the N messages from the target buffer queue.

According to one or more embodiments of the present disclosure, in example 4 of example 2, the sending N messages in the target buffer queue whose timestamps are closest to a current time instant to the target client includes: synchronizing messages in the target buffer queue into a memory; and sending N messages in the memory whose timestamps are closest to a current time instant to the target client.

According to one or more embodiments of the present disclosure, in example 5 of example 1, if the determined message type is the second message type, the method further includes: discarding the current message in a case that a total number of messages sent to the target client within the current time window reaches the first preset threshold.

According to one or more embodiments of the present disclosure, in example 6 of examples 1 to 5, the method is applied to a live broadcast platform, a message of the first message type includes at least one of: a leaderboard messages, a like message, and an emoticon message; and a message of the second message type includes at least one of: a chat message, a barrage message, and a gift-giving message.

According to one or more embodiments of the present disclosure, in example 7 of example 6, the first preset threshold is set according to a priority of a message of the second message type, the first preset threshold corresponding to a high priority message is higher than the first preset threshold corresponding to a low priority message.

According to one or more embodiments of the present disclosure, in example 8, a message sending apparatus is provided, which includes a determining module, configured to determine a message type of a current message received in a current time window, where the message type includes a first message type and a second message type; a buffering module, configured to buffer the current message in a target buffer queue corresponding to the current message if the determined message type is the first message type, where each message in the target buffer queue has an associated timestamp; and a sending module, configured to send the current message to a target client if the determined message type is the second message type, and a total number of messages sent to the target client within the current time window does not reach a first preset threshold, where the target client is a receiver of the current message.

According to one or more embodiments of the present disclosure, in example 9, a computer-readable medium storing a computer program is provided. The computer program, when executed by a processing apparatus, implements steps of the method according to any one of examples 1-7.

According to one or more embodiments of the present disclosure, in example 10, an electronic device is provided, which includes: a storage apparatus storing a computer program; and a processing apparatus, configured to execute the computer program in the storage apparatus, to implement steps of the method according to any one of examples 1-7.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims. Regarding the apparatus in the foregoing embodiment, the manners in which the modules perform operation are described in detail in the embodiment of the method, and are not described in detail here.

The invention claimed is:

1. A message sending method, comprising:
   determining a message type of a current message received by a server in a current time window, wherein the message type comprises a first message type and a second message type, wherein the first message type has a higher demand on real-time performance than the second message type;
   buffering the current message in a target buffer queue corresponding to the current message in response to determining that the current message belongs to the first message type, wherein each message in the target buffer queue has an associated timestamp;
   sending a plurality of messages in the target buffer queue by the server to a target client based on timestamps associated with the plurality of messages at an end of the current time window;
   sending the current message to the target client in response to determining that the current message belongs to the second message type and that a total number of messages sent to the target client within the current time window does not reach a first preset threshold, wherein the target client is a receiver of the current message; and
   discarding the current message by the server in response to determining that the current message belongs to the second message type and that the total number of messages sent to the target client within the current time window reaches the first preset threshold.

2. The method according to claim 1, wherein if the determined message type is the first message type, the method further comprises:
   sending, at the end of the current time window, N messages in the target buffer queue whose timestamps are closest to a current time instant to the target client, wherein N is a positive integer, and a maximum value of N is a second predetermined threshold.

3. The method according to claim 2, wherein after sending the N messages to the target client, the method further comprises: removing the N messages from the target buffer queue.

4. The method according to claim 2, wherein the sending N messages in the target buffer queue whose timestamps are closest to a current time instant to the target client comprises:
   synchronizing messages in the target buffer queue into a memory; and
   sending N messages in the memory whose timestamps are closest to a current time instant to the target client.

5. The method according to claim 1, wherein if the determined message type is the second message type, the method further comprises:
    discarding the current message in a case that a total number of messages sent to the target client within the current time window reaches the first preset threshold.

6. The method according to claim 1, wherein the method is applied to a live broadcast platform,
    a message of the first message type comprises at least one of: a leaderboard messages, a like message, and an emoticon message; and
    a message of the second message type comprises at least one of: a chat message, a barrage message, and a gift-giving message.

7. The method according to claim 6, wherein the first preset threshold is set according to a priority of a message of the second message type, the first preset threshold corresponding to a high priority message is higher than the first preset threshold corresponding to a low priority message.

8. A message sending apparatus, comprising:
    at least one processor; and
    at least one memory communicatively coupled to the at least one processor and storing instructions that upon execution by the at least one processor cause the apparatus to:
    determine a message type of a current message received by a server in a current time window, wherein the message type comprises a first message type and a second message type, wherein the first message type has a higher demand on real-time performance than the second message type;
    buffer the current message in a target buffer queue corresponding to the current message in response to determining that the current message belongs to the first message type, wherein each message in the target buffer queue has an associated timestamp;
    send a plurality of messages in the target buffer queue by the server to a target client based on timestamps associated with the plurality of messages at an end of the current time window;
    send the current message to the target client in response to determining that the current message belongs to the second message type and that a total number of messages sent to the target client within the current time window does not reach a first preset threshold, wherein the target client is a receiver of the current message; and
    discard the current message by the server in response to determining that the current message belongs to the second message type and that the total number of messages sent to the target client within the current time window reaches the first preset threshold.

9. The apparatus of claim 8, the at least one memory further storing instructions that upon execution by the at least one processor cause the apparatus to:
    send, at the end of the current time window, N messages in the target buffer queue whose timestamps are closest to a current time instant to the target client, wherein N is a positive integer, and a maximum value of N is a second predetermined threshold.

10. The apparatus of claim 9, wherein after sending the N messages to the target client, the at least one memory further storing instructions that upon execution by the at least one processor cause the apparatus to:
    remove the N messages from the target buffer queue.

11. The apparatus of claim 9, the at least one memory further storing instructions that upon execution by the at least one processor cause the apparatus to:
    synchronize messages in the target buffer queue into a memory; and
    send N messages in the memory whose timestamps are closest to a current time instant to the target client.

12. The apparatus of claim 8, the at least one memory further storing instructions that upon execution by the at least one processor cause the apparatus to:
    discard the current message in a case that a total number of messages sent to the target client within the current time window reaches the first preset threshold.

13. The apparatus of claim 8, wherein the apparatus is applied to a live broadcast platform,
    a message of the first message type comprises at least one of: a leaderboard messages, a like message, and an emoticon message; and
    a message of the second message type comprises at least one of: a chat message, a barrage message, and a gift-giving message.

14. The apparatus of claim 13, wherein the first preset threshold is set according to a priority of a message of the second message type, the first preset threshold corresponding to a high priority message is higher than the first preset threshold corresponding to a low priority message.

15. A non-transitory computer-readable medium storing a computer program, the computer program, when executed by a computer, cause the computer to:
    determine a message type of a current message received by a server in a current time window, wherein the message type comprises a first message type and a second message type, wherein the first message type has a higher demand on real-time performance than the second message type;
    buffer the current message in a target buffer queue corresponding to the current message in response to determining that the current message belongs to the first message type, wherein each message in the target buffer queue has an associated timestamp;
    send a plurality of messages in the target buffer queue by the server to a target client based on timestamps associated with the plurality of messages at an end of the current time window;
    send the current message to the target client in response to determining that the current message belongs to the second message type and that a total number of messages sent to the target client within the current time window does not reach a first preset threshold, wherein the target client is a receiver of the current message; and
    discard the current message by the server in response to determining that the current message belongs to the second message type and that the total number of messages sent to the target client within the current time window reaches the first preset threshold.

* * * * *